3,293,266
PRODUCTION OF β-PROPIOLACTONE
Rikitaro Kato, Syoichi Nagato, and Yasushi Omori, all of Higashi-ku, Osaka-shi, Japan, assignors to Dai Nippon Celluloid Co., Ltd., Osaka-shi, Japan, a corporation of Japan
No Drawing. Filed July 15, 1964, Ser. No. 382,937
11 Claims. (Cl. 260—343.9)

The present invention relates to a process for the production of β-propiolactone from ketene and formaldehyde in a high yield, more particularly to a novel process for the production of β-propiolactone in the presence of a complex catalyst of anhydrous aluminum chloride and a small amount of anhydrous zinc chloride.

Numerous catalysts have been proposed for the reaction of ketene with carbonyl compounds. Among these, one of the most effective catalysts is that formed from anhydrous aluminum chloride combined with a minor amount of anhydrous zinc chloride so as to give optimum yield of β-propiolactone, such as disclosed in detail in U.S. Patent Nos. 2,356,459 and 2,424,590.

The solvent for such catalyst and the reaction medium have also been disclosed in U.S. Patent Nos. 2,356,459, 2,424,589 and 2,424,590, in which various solvents such as acetone, ethyl ether, methyl ethyl ether, ethyl chloride, isopropyl chloride, carbon disulfide, dioxane, β-propiolactone and the like are used. Recently, the use of lower aliphatic acid esters, for example, ethyl acetate are suggested as the solvent for the catalyst as in Japanese patent publication No. 18970/1961. The best solvent among those above-described may be ethyl acetate, since it provides a highly concentrated catalyst solution which, in addition, is stable for long time periods.

As for the reaction medium, β-propiolactone seems the most favorable for industrial process since it eliminates a specially designed recovery system for the medium.

These known processes involve the operations of dissolving the catalyst in the aforesaid organic solvent, or dissolving a portion of the resulting catalyst solution in the β-propiolactone to be used, and then the catalyst solution is used as the reaction medium. Ketene and formaldehyde are fed into said catalyst solution as equimolecular mixed gases.

However, the conventional catalysts such as a Friedel-Crafts type catalyst dissolved in an organic solvent, not only often tends to convert into inactive substances by the presence of water or ketene but also to promote unfavorable side reactions, other than the main reaction of ketene with formaldehyde in the solution. Therefore, the reaction must be carried out in the absence of water as far as possible and an accurate equimolar mixture of ketene and formaldehyde must be fed. It is, however, so difficult to satisfy these conditions at the same time that the yields of β-propiolactone attained by such prior patent processes are always no more than 85%.

An object of this invention is to provide an improved process wherein the above-mentioned disadvantages of the known catalysts can be eliminated and the reaction can be carried out more easily.

Another object of this invention is to increase the selectivity of β-propiolactone formation to produce a yield as high as 90% or more by using a complex type catalyst.

These objects have now been attained by using as the catalyst a complex of anhydrous aluminum chloride and a small amount of anhydrous zinc chloride.

Features recognized from the result of our experimental study by using the new complex catalyst are enumerated as follows:

(1) The catalyst of this invention is a complex obtained by gradually adding β-propiolactone to the conventional catalyst solution in an organic solvent thereby effecting the ring-opening reaction. This reaction is carried out in the presence of a proper amount of water. This catalyst completely differs in its appearance, physical nature and composition from the conventional catalyst.

(2) The catalyst of this invention is far more stable for long time periods in acetone solvents, whereas the conventional catalyst quickly reduces its activity, for instance, forming a gel even after 24 hours in acetone.

(3) Generally, it was difficult to estimate the analytical amounts of both pure ketene and formaldehyde, therefore excess feed of either gas could not be avoided unless very carefully controlled. Then with the conventional catalyst, the yield of the product fluctuates and furthermore the reaction liquid produces a suspension which requires the successive purification step.

(4) The catalyst of this invention permits favorable results in preventing the polymerization or degradation during purification, which usually results in the loss of β-propiolactone and therefore has been a matter of great technical importance in the art in its industrial scale production. In accordance with the conventional processes, the purification of the crude reaction product from the β-propiolactone synthesis should have been generally carried out by distilling and purging the crude β-propiolactone at a reduced temperature for a short period of time to prevent the polymerization thereby removing those components which would bring about the polymerization during successive rectification step (such as catalyst, polymer formed during the synthesis, etc.), then subjecting the crude β-propiolactone to rectification. On the other hand, the reaction liquid obtained by employing the present complex type catalyst has no tendency of polymerization not only during the purging operation but in successive operations as well whereby the yield at the purification step is greatly enhanced.

The reason for that has not yet been clearly understood up to now, but the effect will be evidenced by the results of the following experiments which illustrate the degree of polymerization in the rectification step by a metallic apparatus. The kettle residue in the table was analyzed to consist of mainly the polymer of β-propiolactone.

TABLE

Comparison in the amounts of kettle residue formed during the distillation of β-propiolactone obtained by using the catalyst of this invention and prior catalysts.]

| Catalyst composition employed | Kettle residue (parts by weight per 450 parts of crude purge β-propiolactone feed) | Kettle residue proportion to feed (percent by weight) |
|---|---|---|
| Prior catalyst, solution of aluminum chloride and zinc chloride in acetone. | More than 60 | More than 13.3. |
| Solution in ethyl acetate of above components. | More than 20–60 (much uneven). | More than 4.5–13.3. |
| Complex catalyst solution of this invention prepared by using acetone. | 12–20 | 2.7–4.5. |
| Complex catalyst solution of this invention prepared by using ethyl acetate. | 12–30 | 2.7–6.7. |

(5) The complex catalyst of this invention can attain highest yield of β-propiolactone which has not been obtained in any other prior processes. This is particularly remarkable in such case where the feed molar ratio of ketene to formaldehyde becomes somewhat irregular and where water, acetic acid or acetic anhydride is present in the reaction system, thus we can obtain more increased yield than using conventional catalysts.

For the purpose of better understanding of this effect, experiments are carried out in one case using aluminum chloride solution in ethyl acetate, which is disclosed in Japanese patent publication No. 18970/1961, and in another case using the complex catalyst of this invention. The results of these experiments are given in the following table. The yields in the table show theoretical yield of β-propiolactone obtained after purification by distillation based on ketone fed.

Comparison of yields of β-propiolactone between the cases of using the catalyst of this invention and conventional catalyst.

TABLE

|  | Yield, percent | |
| --- | --- | --- |
|  | Catalyst of this invention | Catalyst of J.P. 18970/61 |
| Optimum condition | 91.2 | 88.8 |
| 5 mol percent in excess of ketene fed | 87.1 | 76.5 |
| In the presence of 1% water in the reaction system | 80.5 | 67.4 |
| In the presence of each 5% of acetic acid and acetic anhydride | 90.0 | 61.5 |

It will be understood from the table above that the catalyst of this invention enables to obtain remarkable selectivity without affect by contaminant materials existing in certain amounts in the reaction system.

(6) The complex catalyst of this invention is prepared under such controlled conditions that a complex containing adequate amount of water is obtained, therefore they have a particular configuration.

In the specifications of U.S. Patents Nos. 2,450,134 and 2,739,158, it is described that Friedel-Crafts catalysts, especially zinc chloride catalyst tend to easily form a complex with β-propiolactone, thus the reaction product is lost. Furthermore the inventors of these U.S. patents had not known that such complex had catalytic activity and had been separated.

In the present invention, we make a special complex catalytic containing a suitable amount of water by using specific conditions, and this complex has a particular form different from other catalysts. By using such specific catalyst we can obtain high yield of β-propiolactone using comparatively small amounts of β-propiolactone.

A general method for preparing the complex catalyst of this invention is as follows:

To a solution of the mixture of anhydrous aluminum chloride and anhydrous zinc chloride in a suitable organic solvent, there is added gradually β-propiolactone and water under vigorous agitation to form a complex having a variety of particular colors and configurations depending upon the kind of solvent used. The ratio of anhydrous aluminum chloride and anhydrous zinc chloride used may be within the range of 1 to 0.05–0.5, and preferably in the range of 1:0.05–0.15 by weight such as disclosed in Patent No. 2,424,590.

The higher concentration as far as possible of anhydrous aluminum chloride and zinc chloride in solution would be of course the more favorable.

Although each component is not necessary to be completely dissolved in the solvent, it is preferred to use a solution in the view of the easiness of its feeding to the reaction system. Another preferable manner of preparing the solution is to separately dissolve each component in the organic solvent and thereafter to combine the resulting two solutions.

The solvents to be used for preparing the complex may be any known solvent unless they are not highly reactive with anhydrous aluminum chloride or β-propiolactone, and such solvent include ketones, ethers, halogenated hydrocarbons, carbon disulfide, etc. The most desirable solvents, however, are acetone, ethyl acetate and diethyl ether, and the like.

The reaction for forming the complex catalyst of this invention is exothermic. Unless the heat is removed not only does this promote the undesirable polymerization of β-propiolactone to be added afterwards but it also increases the hardness of the complex so formed thus inviting the difficulty in handling it.

However, too low a temperature will make the complex formation incomplete. The preferred temperature for the complex formtaion ranges from 30° C. to 45° C. so that adequate external cooling must be employed. However, the temperature at which the complex formation is carried out is not limitative since the complex having a sufficient activity forms at the temperature of even about 0° C. or about 60° C.

Since formation of the complex begins immediately after adding a small amount of β-propiolactone to a conventional catalyst composition prepared by adding a mixture of anhydrous aluminum chloride and anhydrous zinc chloride to an organic solvent, the complex has sufficient catalytic activity even if the amount of added β-propiolactone is small.

The reaction for forming the complex is considered to be complete upon the addition of three moles of β-propiolactone per mole of anhydrous aluminum chloride, and therefore the addition of any further amount of β-propiolactone will only dilute the complex already formed therewith. However, suitable excessive β-propiolactone will serve as a softening agent for the too hard complex catalyst. Therefore, addition in large amounts of β-propiolactone is not meaningless. Consequently, the amount of the addition of β-propiolactone is not more limitative, although 2 to 3 moles per mole of anhydrous aluminum chloride is preferable.

When a small amount of anhydrous aluminum chloride solution in organic solvent is added to a great amount of β-propiolactone, the complex can not be successfully obtained, and increasing the reaction temperature to promote the complex formation will simultaneously favor the polymerization of β-propiolactone greatly. The same difficulty arises even if an adequate amount of β-propiolactone is used, as long as the anhydrous aluminum chloride solution in organic solvent is added thereto.

Thus, as described hereinbefore, only the addition of β-propiolactone to the solution of anhydrous aluminum chloride in organic solvent is suitable for the economical production of the complex catalyst of this invention.

The water to be added upon the complex formation plays an important role not only softening the complex formed but also remarkably increasing the catalytic activity depending upon the amount of its addition. The complex prepared under absolutely anhydrous conditions is always too hard to handle and has very low activity. However, the amount of water may be a very slight amount, that is, as little as that absorbed during the complex formation by take-up moisture even without any intentional addition of water thereto.

The presence of such minor amounts of water satisfactorily increases the catalytic activity. Thus, if desired, the complex formation reaction may be carried out without the addition of water but under conditions capable of absorbing moisture to give highly active catalyst.

The configuration of the resulting complex may be changed depending on the time of adding water, and all of which may be suitably utilized as the catalyst. Therefore, no limit exists in the amount and at the period of water addition, but it is preferred to add about equimolar proportion of water to the anhydrous aluminum chloride after about two moles of β-propiolactone has been added to one mole of anhydrous aluminum chloride.

If the complex formed in the manner described hereinabove is too hard, it may be further dissolved in an additional amount of β-propiolactone to soften it, because no further polymerization of β-propiolactone takes place.

The thus obtained complex catalyst does not show any change in quality and reduction of activity even when allowed to stand at room temperature for a long time.

The chemical structure of the complex is not yet clear. However, it can be apparently pointed out from the infrared ray spectrum test that the complex of this invention is not a mere mixture of anhydrous aluminum chloride β-propiolactone or polymer, but is a complex formed by the result of a ring-opening reaction of β-propiolactone.

The following examples are presented to illustrate the process for the synthesis of β-propiolactone, by the present invention, but it is not limited to the specific embodiments thereof.

*Example 1*

20 g. of anhydrous aluminum chloride dissolved in 50 g. of acetone is combined with a solution of 1.5 g. of anhydrous zinc chloride in 10 g. acetone. The resulting solution mixture is stirred vigorously under sufficient hydroscopic condition while 32.5 g. of β-propiolactone are slowly added dropwise thereto maintaining the temperature of the solution mixture about 40° C.

At the end of dropwise addition of β-propiolactone, a soft gelatin-like complex is obtained. To 22 g. of the resulting complex dissolved in 1900 g. of β-propiolactone, there are added 340 g. of an equimolar gas mixture of ketene and formaldehyde while maintaining the temperature at 15–20° C.

Distillation under reduced pressure of the completely reacted solution gives an increment in the amount of β-propiolactone corresponding to 91% of ketene gas fed.

*Example 2*

20 g. of anhydrous aluminum chloride dissolved in 50 g. of acetone is admixed with a solution of 1.5 g. of anhydrous zinc chloride in 10 g. of acetone. The combined acetone solutions are carefully stirred so as not to take up any moisture while there is added thereto dropwise β-propiolactone at such a rate that the temperature of the reaction mixture is kept between about 40° C. to 45° C., utilizing if required, external cooling.

The addition of β-propiolactone is interrupted at the time when the added amount has reached 22 g., and then 2.7 g. of water is added dropwise under the same condition, which is then followed by the further addition of 10.5 g. of β-propiolactone to give a rather viscous reddish-black colored complex catalyst solution. To 23 g. of the catalyst solution which is further dissolved in 1900 g. of β-propiolactone, an equimolar gas mixture of ketene and formaldehyde is introduced at the rate of 340 g. per hour while maintaining the temperature between 115° C. and 120° C. 4.1 g. per hour of the catalyst solution is quantitatively fed to the reaction system in order to maintain the catalyst concentration in the system constant.

Increased amount of the liquid formed during operation is withdrawn as an overflow and distilled under reduced pressure to give a 90 mole percent yield of β-propiolactone to the ketene gas fed.

*Example 3*

20 g. of anhydrous aluminum chloride dissolved in 50 g. of ethyl acetate is combined with a solution of 2.0 g. of anhydrous zinc chloride in 10 g. ethyl acetate. To the combined solution is added dropwise, while stirring, β-propiolactone at a rate sufficient to maintain the temperature of the solution within about 40–45° C. while completely preventing moisture absorption during the stirring. Suitable external cooling may be applied if necessary. The addition of β-propiolactone is once interrupted when 22 g. of its addition has completed, and 2.7 g. of water is added under the same conditions after which β-propiolactone is again added to give yellow brown colored and viscous liquid complex catalyst.

23 g. of the catalyst is then dissolved into 1900 g. of additional β-propiolactone, and therein is passed an equimolar gas mixture of ketene and formaldehyde at feed rate of 340 g. per hour while maintaining the temperature between 15° C. and 20° C. 4.1 g. of the catalyst liquid is supplied to the system per hour in order to maintain the catalyst concentration constant.

Increased amount of β-propiolactone formed during operation is withdrawn as overflow, and distilled under reduced pressure to give a yield of 90 mole percent to the ketene gas fed.

Thus, having described the invention, various modifications may be made without departing from the spirit of this invention which is not limited except as set forth in the following claims.

What is claimed is:

1. A process for the production of β-propiolactone from ketene and an aldehyde comprising reacting the ketene and aldehyde in the presence of a complex catalyst of β-propiolactone, aluminum chloride and zinc chloride which is prepared by adding β-propiolactone dropwise into a solution of anhydrous aluminum chloride in a solvent containing a small amount of zinc chloride, water being also added to said solution.

2. A process as claimed in claim 1 wherein the ratio of anhydrous aluminum chloride to anhydrous zinc chloride is 1:0.05–0.5 by weight.

3. A process as claimed in claim 1 wherein said organic solvent is acetone, ethyl ether, an organo halide, carbon disulfide, ethyl acetone or methyl acetate.

4. A process as claimed in claim 1 wherein the amount of β-propiolactone added is from 2 to 3 moles per mole of anhydrous aluminum chloride.

5. A process as claimed in claim 1 wherein the amount of water added is less than 1 mol per mole of anhydrous aluminum chloride.

6. A process as claimed in claim 1 wherein said organic solvent is used in a sufficient amount so that anhydrous aluminum chloride and anhydrous zinc chloride can be dissolved with agitation.

7. A process as claimed in claim 1 wherein the catalyst is prepared at 30–45° C.

8. A process for the production of a catalyst which is adapted for being added to β-propiolactone for the production of further β-propiolactone by the reaction therein of ketene with an aldehyde, said process comprising dissolving anhydrous aluminum chloride and anhydrous zinc chloride in a weight ratio of 1:0.05 to 0.5 in an organic solvent, adding dropwise to the resulting solution β-propiolactone in an amount from 2 to 3 moles per mole of anhydrous aluminum chloride while maintaining the temperature at between 30 and 45° C., and adding water to the solution in an amount less than one mole per mole of anhydrous aluminum chloride.

9. A process as claimed in claim 8 wherein the water is added in equimolar amount to the anhydrous aluminum chloride after about two moles of the β-propiolactone has been added per mole of anhydrous aluminum chloride, after which any remainder of the β-propiolactone is added.

10. A process as claimed in claim 1 wherein the water is added with the β-propiolactone.

11. A process as claimed in claim 1 wherein the water is added after the β-propiolactone.

References Cited by the Examiner

UNITED STATES PATENTS 3,029,253  4/1962  Wheeler et al. _____ 260—343.9
3,069,433  12/1962  Dunn _____ 260—343.9

WALTER A. MODANCE, *Primary Examiner.*

JAMES A. PATTEN, *Assistant Examiner.*